(12) United States Patent
Kuykendall et al.

(10) Patent No.: US 9,317,693 B2
(45) Date of Patent: Apr. 19, 2016

(54) SYSTEMS AND METHODS FOR ADVANCED DYNAMIC ANALYSIS SCANNING

(71) Applicant: RAPID7, LLC, Boston, MA (US)

(72) Inventors: Dan Kuykendall, La Mirada, CA (US); Matthew Cohen, Irvine, CA (US); Dmitriy Kashitsyn, Yorba Linda, CA (US); Andrew Tisdale, Huntingdon Beach, CA (US); Michael J. Morton, Anaheim Hills, CA (US); Artem Astrakhantsev, Kirkland, WA (US)

(73) Assignee: RAPID7, LLC, Boston, MA (US)

( * ) Notice: Subject to any disclaimer, the term of this patent is extended or adjusted under 35 U.S.C. 154(b) by 50 days.

(21) Appl. No.: 14/060,516

(22) Filed: Oct. 22, 2013

(65) Prior Publication Data

US 2014/0123295 A1 May 1, 2014

Related U.S. Application Data

(60) Provisional application No. 61/717,061, filed on Oct. 22, 2012.

(51) Int. Cl.
*H04L 29/06* (2006.01)
*G06F 21/57* (2013.01)

(52) U.S. Cl.
CPC ........ *G06F 21/577* (2013.01); *G06F 2221/034* (2013.01)

(58) Field of Classification Search
USPC .......................................................... 726/25
See application file for complete search history.

(56) References Cited

U.S. PATENT DOCUMENTS

| 6,584,569 | B2 | 6/2003 | Reshef et al. | |
|---|---|---|---|---|
| 7,185,232 | B1 | 2/2007 | Leavy et al. | |
| 7,620,851 | B1 | 11/2009 | Leavy et al. | |
| 8,752,183 | B1 * | 6/2014 | Heiderich et al. | 726/25 |
| 2007/0061877 | A1 * | 3/2007 | Sima et al. | 726/12 |
| 2008/0028065 | A1 * | 1/2008 | Caso et al. | 709/224 |
| 2014/0208426 | A1 * | 7/2014 | Natarajan et al. | 726/23 |

\* cited by examiner

*Primary Examiner* — Jeffrey Pwu
*Assistant Examiner* — William Corum, Jr.
(74) *Attorney, Agent, or Firm* — One LLP

(57) ABSTRACT

The field of the invention relates to systems and methods for advanced dynamic analysis scanning for vulnerabilities using a universal translator. In an embodiment, the system includes a dynamic analysis scanner subsystem communicatively coupled to a networked computing system; the scanner subsystem is configured to crawl one or more dynamic web pages of the networked computing system, generate test data for the networked computing system, transmit the generated test data to the networked computing system, and record the networked computing system's response to the generated test data. The scanner may further comprise a universal translator configured to detect vulnerabilities and generate test data for the dynamic web pages of the networked computing system. The scanner subsystem may further comprise a smart scheduler.

3 Claims, 14 Drawing Sheets

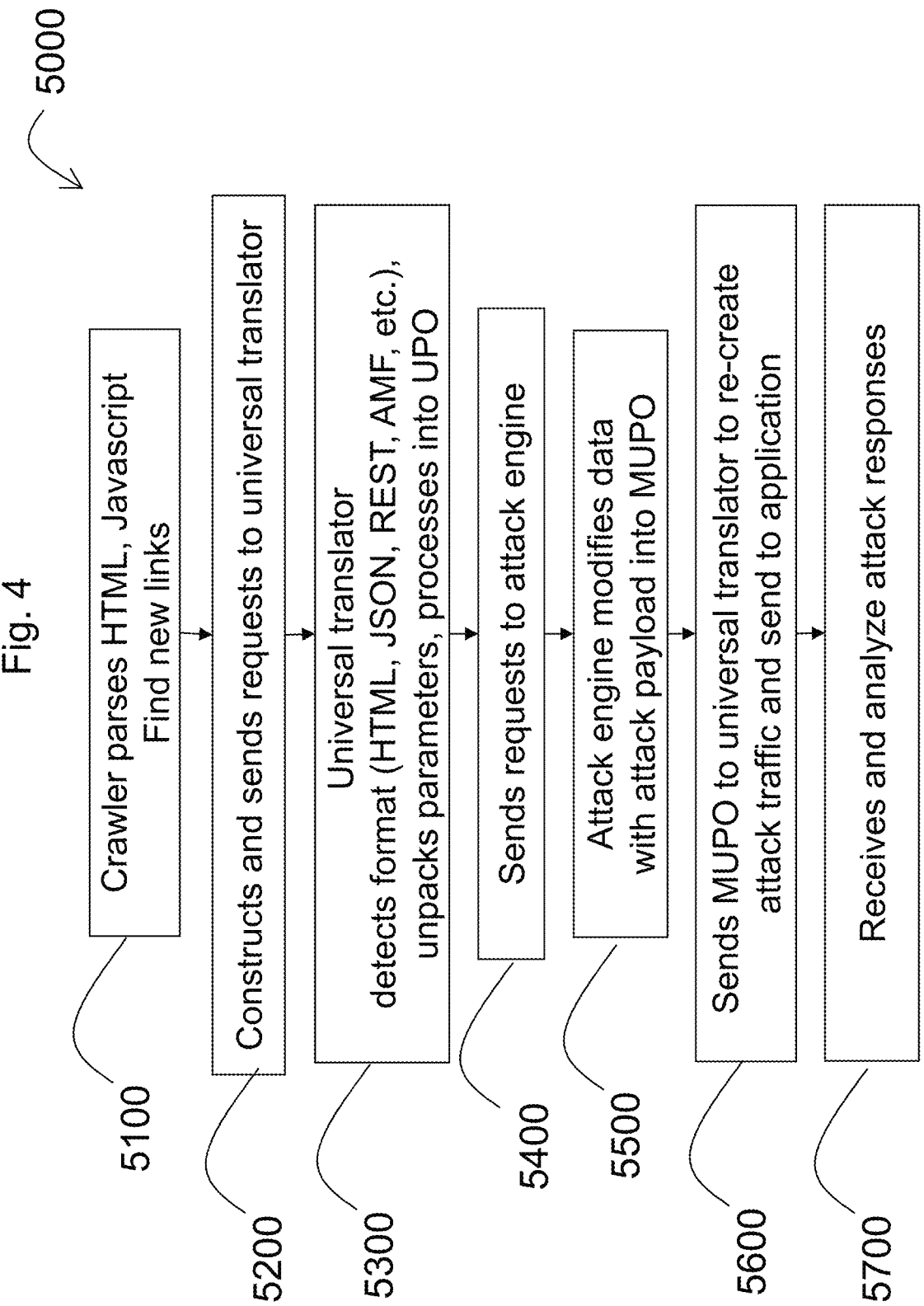

Fig. 5

```
<table>
<tr><td>First Name:</td><td><input name="fname" /></td></tr>
<tr><td>Last Name:</td><td><input name="lname" /></td></tr>
<tr><td>Address:</td><td><input name="addr" /></td></tr>
<tr><td>State:</td><td><input name="state" size="2" /></td></tr>
<tr><td>Zip:</td><td><input name="zip" size="5" /></td></tr>
</table>
```

First Name:
Last Name:
Address:
State:
Zip:

Fig. 6

First Name: aaaa
Last Name: aaaa
Address: aaaa
State: aaa
Zip: aaaa

First Name: aaaa
Last Name: aaaa
Address: aaaa
State: aaa    Please provide a valid State
Zip: aaaa     Please provide a valid Zip code

SYSTEMS AND METHODS FOR ADVANCED DYNAMIC ANALYSIS SCANNING

CROSS-REFERENCE TO RELATED APPLICATION

The present application claims priority to U.S. Provisional Application No. 61/717,061 filed Oct. 22, 2012, which is hereby incorporated by reference in its entirety.

FIELD OF THE INVENTION

The field of the invention relates to systems and methods for advanced dynamic analysis scanning, and more particularly to systems and methods for advanced dynamic analysis scanning for vulnerabilities using a universal translator.

BACKGROUND OF THE INVENTION

Placing a computing device on a public computer network, such as the Internet, subjects the computing device to considerable risk of unauthorized access and misuse by other entities. This is particularly true for server systems (such as websites on the Internet) that receive large amounts of data traffic, many of which come from unknown or anonymous sources. Web application security scanners (or web application vulnerability scanners) have been developed to identify potential security vulnerabilities. These scanners crawl a web application to find application layer vulnerabilities. However, over the last several years, there has been a major evolution in how web applications are built with new underlying technologies, application architectures and data formats. Web pages built with new technologies also have content that varies based on parameters provided by users or other applications. But web application security scanners have failed to evolve to keep pace with this shift. Web application security scanners were architected in the old ways of web application security when almost all web applications were static and relatively simple HTML pages. Current scanners only scan classic HTML and Javascript, and do not scan and detect vulnerabilities in the new technologies, e.g., Mobile, JSON, REST, AJAX, and so on. Accordingly, improved systems and methods for advanced dynamic analysis scanning for vulnerabilities using a universal translator for new technologies are desirable.

SUMMARY OF THE INVENTION

The field of the invention relates to systems and methods for advanced dynamic analysis scanning for vulnerabilities using a universal translator.

In an embodiment, the system includes a dynamic analysis scanner subsystem communicatively coupled to a networked computing system; the scanner subsystem is configured to crawl one or more dynamic web pages of the networked computing system, generate test data for the networked computing system, transmit the generated test data to the networked computing system, and record the networked computing system's response to the generated test data. The scanner may further comprise a universal translator configured to detect vulnerabilities and generate test data for the dynamic web pages of the networked computing system. The scanner subsystem may further comprise a smart scheduler.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 4 is an exemplary diagram of a process according to an embodiment of the present invention.

FIG. 5 is an exemplary parameter type.

FIG. 6 is another exemplary parameter type.

DETAILED DESCRIPTION OF THE PREFERRED EMBODIMENTS

Figure 1:
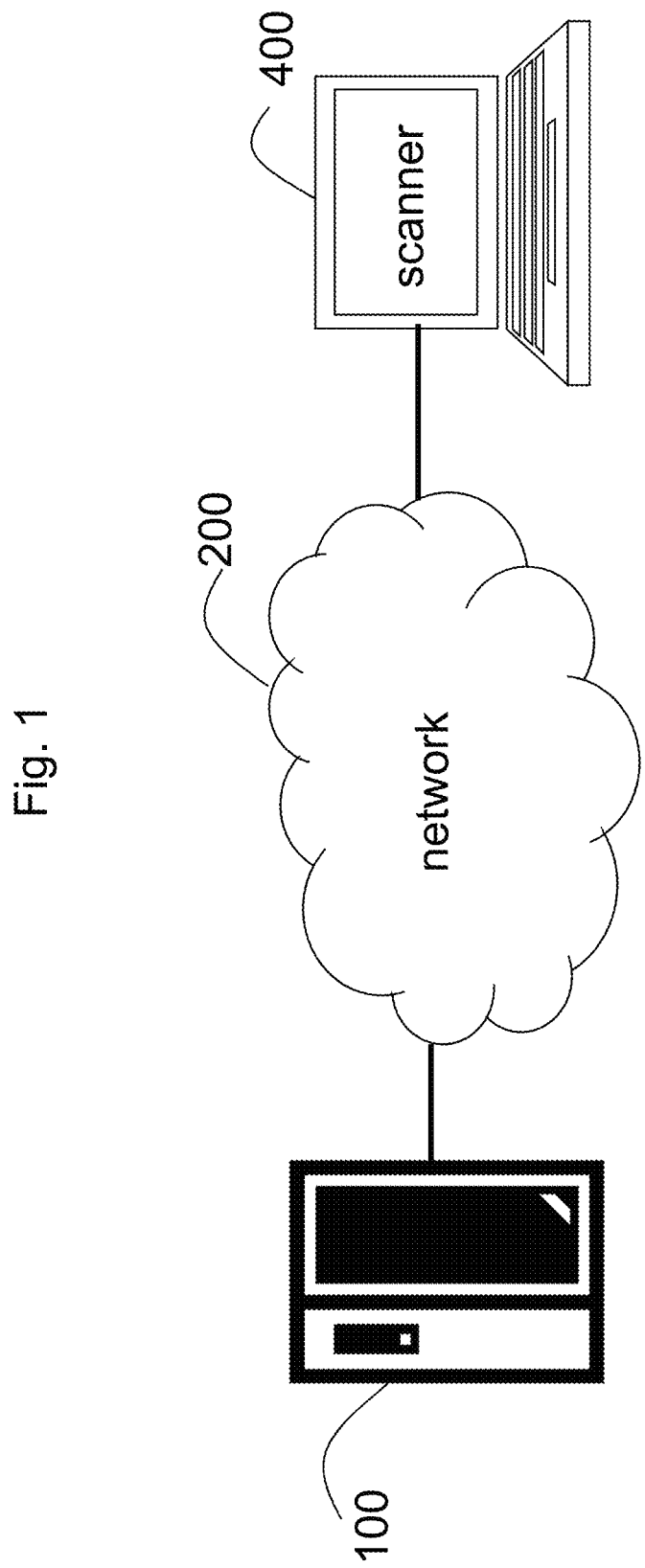
FIG. 1 is an exemplary diagram of a scanner and a networked computing system according to an embodiment of the present invention.

Turning to FIG. 1, the web application scanner 400 (which may also be referred herein as scanner 400) is generally configured to provide pre-attack analysis, discover vulnerabilities, and provide attack data and interactive reports, and so on. The scanner 400 identifies page(s) in a website and/or web application at a server 100 over network 200, such as a public network (e.g., the Internet and/or a cellular-based wireless network) or a private network, and dynamically creates a list of pages and parameters for testing mobile and web applications that utilize new technologies, for example, Representational State Transfer ("REST"), Asynchronous JavaScript and XML ("AJAX"), JavaScript Object Notation ("JSON"), Google Web Toolkit ("GWT"), and so on. As such, the scanner 400 identifies dynamic web pages that include, but are not limited to, pages with content that varies based on parameters provided by users or other applications. For instance, the scanner 400 can identify variable names and types, such as standard GET & POST parameters, or data inside JSON, REST, Action Message Format ("AMF"), Simple Object Access Protocol ("SOAP") data formats, and so on. The page and parameter name combinations (with types) can be used to create test data. This can be achieved by either recording actual packets or by placing the page data in a database and reconstructing the packets. The scanner 400 can be provided either as an application or in the form of a third party service, known in the art as software as a service ("SaaS"). The scanner 400 also provides interactive and structured reports.

Figure 2:
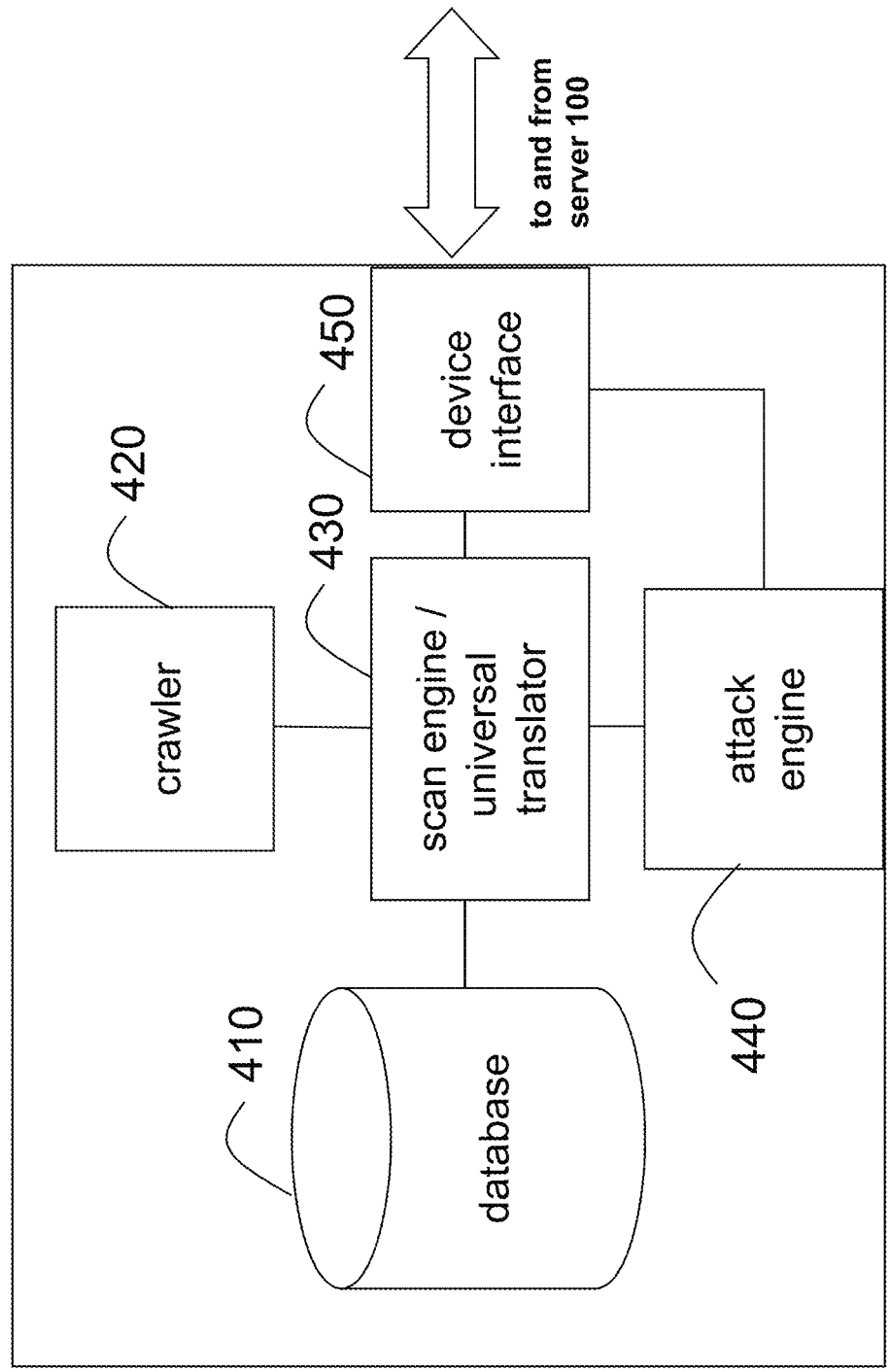
FIG. 2 is an exemplary block diagram of a scanner according to an embodiment of the present invention.
Figure 3:
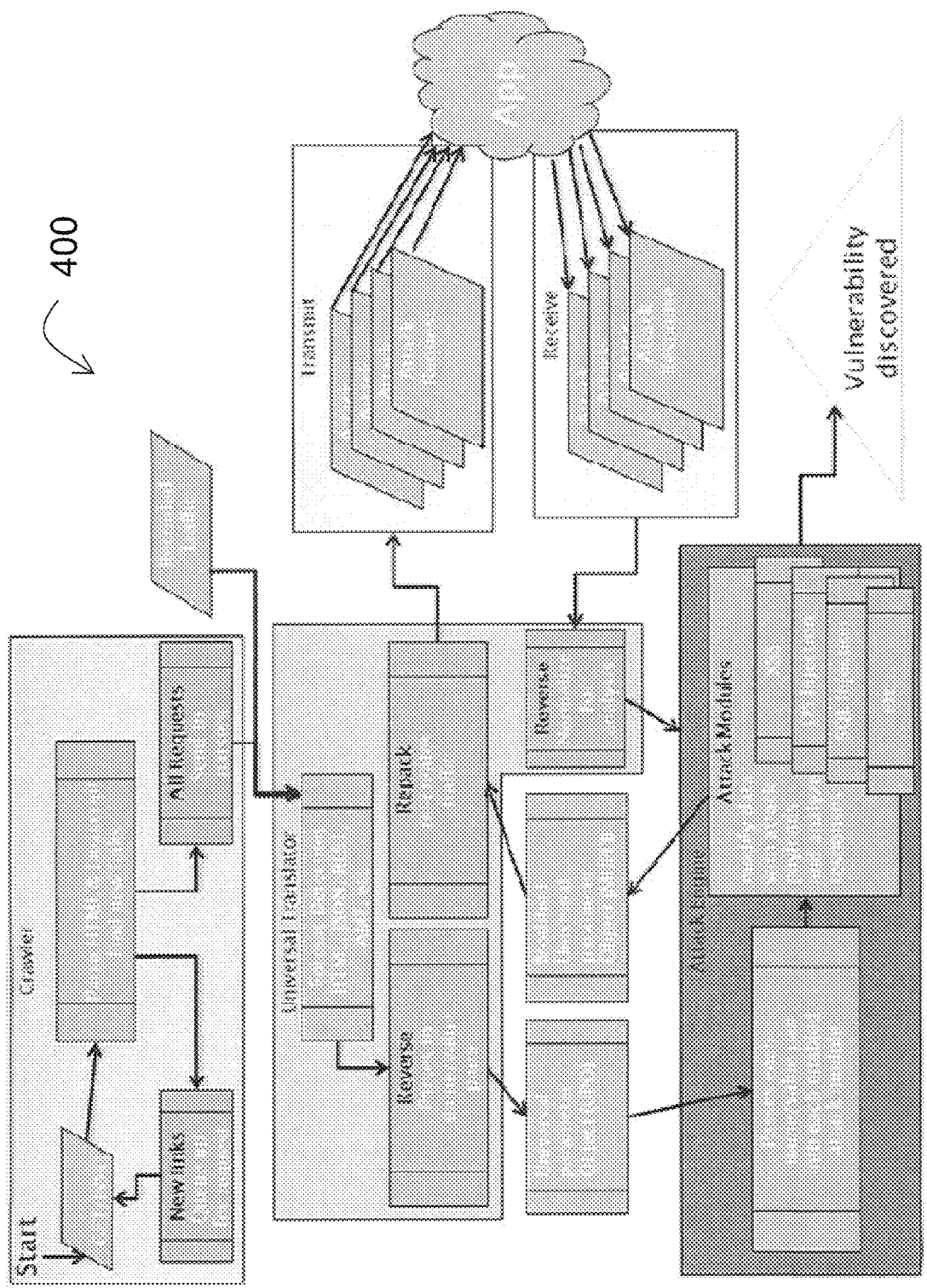
FIG. 3 is another exemplary block diagram of a scanner according to an embodiment of the present invention.

Turning to FIG. 2, a diagram of a scanner 400 according to an embodiment is shown. The scanner 400 may be implemented and/or distributed on one or more physical computing systems, each having one or more processors, memory, an operating system, and input/output interface, and a network interface all known in the art. The scanner 400 is programmed to employ an algorithm to detect the format of a request and then parse and convert it into a universal object representation ("UPO"). The scanner 400 includes a crawler 420, a scan engine/universal translator 430, an attack engine 440, a database 410, a device interface 450 implemented with technology known in the art for communication with the server 100, and so on. The database 410 may be implemented with technology known in the art, such as relational database and/or object oriented database. Another diagram of the scanner 400, according to an embodiment, is shown in FIG. 3.

Turning to FIG. 4, an electronic process 5000 illustrating an operation of the scanner 400 according to an embodiment is shown. As shown in FIGS. 3 and 4, the crawler 420 receives inputs, (manually or automatically), parses the inputs (e.g., HTML, Javascript, and so on), finds new links (Action Block 5100), constructs requests, sends requests to and receives responses from the scan engine/universal translator 430 (Action Block 5200), and so on. In an embodiment, a user may set the number of links the crawler 420 may crawl. The crawler 420 may crawl all pages of a received (or "seed") URL or domain, or crawl only the received ("seed") URLs. In an embodiment, outputs from the crawler 420 may be stored in the database 410 and provided to the scan engine/universal translator 430 (Action Block 5200) as prerecorded data.

In some implementations, the format could have nested formats inside which the universal translator 430 can support. For example the URL contains a standard name=value parameter which contains an XML or JSON string. Another example would be a standard post parameter which contains a SQL string. Inside the SQL statement one of the values is an XML document. The solution may provide for recursively nested formats to allow for parsing and testing.

In the following sections, various embodiments of methodologies of the scanner 400 for scanning and attacks will be described in more details.

Universal Parameter Object Technique.

In an embodiment, the scan engine/universal translator 430 receives requests constructed by the crawler 420 and detects the request format (e.g., HTML, JSON, REST, AMF, and so on). The scan engine/universal translator 430 detects parameter packing type, unpacks the parameters ("reverse parsing"), processes them into a common format ("universal parameter object," or UPO) (Action Block 5300), and sends them to the attack engine 440 (Action Block 5400).

The attack engine 440 receives the requests in the common format (UPO) and modifies them with attack payload (e.g., XSS, OS Injection, SQL Injection, and so on) (Action Block 5500) into "modified universal parameter object" (MUPO). The attack engine 440 modifies requests using defined list or dynamic algorithms. In an embodiment, the attack engine 440 sends the modified requests (MUPO) to the scan engine/universal translator 430 which re-creates (re-packs back into original format, but with the inclusion of the attack payload) the requests into attack requests and transmits them to the server 100 (Action Block 5600). The attacks can be scheduled and prioritized based on different criteria, for example, website, directory, file, parameters, and so on. When the scanner 400 receives responses from the server 100, it analyzes the responses and determines vulnerabilities of the server 100 web applications. The response may be in a different format, or one that needs to be normalized for analysis.

Fingerprinting Server Functionality (Response Signature Algorithm).

In another embodiment, the scanner 400 utilizes a page fingerprinting technology (or fingerprinting server functionality/response signature algorithm) in creating attack requests, or utilizes the page fingerprinting technology in conjunction with the variable value limiting approach. To illustrate, a known problem in web application scanning is how to test all of the functionality of a web application in a finite amount of time when the application appears to have a very large or even infinite amount of content. The most common example of this problem is called "the calendar problem." An exemplary URL structure may look like: www.site.com/page.asp?day=x&month=y&year=z which displays a given day of a calendar, such as www.site.com/page.asp?day=1&month=2&year=2013 would show a page for Feb. 1, 2013. The problem of this example is that while there is only one section web application code responsible for creating the infinite number of days in a calendar, testing every page on the website will take forever. In the variable value limiting approach, a scanner only tests a limited number of values of each variable, for example, www.site.com/page.asp?day=1&month=2&year=2013, www.site.com/page.asp?day=1&month=2&year=2014, www.site.com/page.asp?day=1&month=2&year=2014, www.site.com/page.asp?day=2&month=2&year=2013, www.site.com/page.asp?day=2&month=3&year=2013, www.site.com/page.asp?day=2&month=3&year=2013, and so on. Another known problem is when a variable value actually changes the functionality on a page. For example, a system can have www.site.com/mylife.asp?function=calendar for the calendar front page, www.site.com/mylife.asp?function=email for the e-mail front page, and www.site.com/mylife.asp?function=contacts for the contacts front page. While a human can surmise that those three pages are completely different and represent different code that needs to be tested independently, a computing tool lacks the ability to comprehend the content. Another example of similar problem is when web application creates an encoded URL, for example, www.site.com/987435234857847350298437502352304758234950987, the variable value limiting approach would fail on this site. There are also sites that do not follow conventional URL structures, for example, with www.site.com/page/day/1/month/2/year/2013, it is difficult to tell which is the directory, which is the variable name, and which is the variable value. This creates at least two difficulties: (a) the web application scanner cannot use the variable value limiting approach to limit the number of times that a given variable is attacked, (b) the web application scanner cannot tell which is the directory and realize that it should not be attacked.

To solve the above problems, the scanner 400 has a response signature algorithm that will analyze the response and split the response into sub-parts. This can work with any format including, but not limited to, HTML, JSON, REST, XML, AMF, and so on. The page will then have a collection of signatures generated based on the format and scoring of each page. These signatures will enable the scanner 400 to calculate closeness of similarity between responses. To illustrate, these two pages are nearly identical looking: www.site.com/it/hat (e.g., which includes a picture of the hat, and text describing it, and www.site.com/it/glove (e.g., which includes a picture of the glove, and text describing it). The only difference between these pages is the img src value for the picture, and a small amount of text. The signature algorithm would be able to determine that the pages are nearly identical and realize that only a little text is changing and that these pages are likely being generated from the same code and could take actions to reduce and/or alter priority of the attacking. As a result, the web application scanner 400 would be able to detect the appearance of new functionality during the crawl, and act differently based on that information both during the crawling and the attacking phase.

In an embodiment, the signature algorithm generally is:
if response has new functionality
then
   schedule for attacking and
   continue iterating through possible values if not exceed parameter value tolerance limit (for parameter-operator)
else
   stop crawling after exceeding parameter value tolerance limit (for data-query parameter).

In an embodiment, the scanner 400 combines the above techniques with matching page elements to increase confidence of attack vector detection. To illustrate, for the two pages www.site.com/it/hat (e.g., which includes a picture of the hat, and text describing it, and www.site.com/it/glove (e.g., which includes a picture of the glove, and text describing it), the scanner 400 would have higher confidence that hat and glove are variables driving dynamic page content on those pages.

In another embodiment, the scanner 400 can also present the user with the ability to tell it the schema for different pages. For example, with www.site.com/myoutlook/page/year/2013, the scanner 400 would allow the user to tell it that directories, variables and variable values are separated by/marks. The user could then indicate in a form that:

The first item between the slashes is a directory and should not be attacked

The second item between the slashes is a page name and should not be attacked

The third item between the slashes is a variable name and should be minimally attacked The fourth item between the slashes is a variable value and should be attacked.

The user can also tell the scanner 400 to repeat certain elements of a request that are not directories and not attack them. Wildcards can be used to help users to target certain names. Also, there can be multiple schemas like this on a website and the user may be allowed to use pattern matching to help the scanner 400 match a particular pattern. For example, the user can type myoutlook and instruct the scanner 400 that this indicates that the pages is the first pattern above. This schema can also be presented after an initial scan with guesses as to how certain pages should be treated and this would be modifiable by the user. This approach of allowing users to define a template for analysis of a web application can also be used against non-web applications, for example, mobile applications, and so on.

Parameter-Type Analysis.

In another embodiment, the scanner 400 utilizes a parameter-type analysis. Websites often use input parameters in different ways, as such, in order to better analyze the web application, the scanner 400 analyzes how the web site will use the parameter. To illustrate, when a website receives a request, it processes the input parameters and then generates a response based on the requested URL and a parameter set. A Web site processes input parameters in different ways. Examples of parameter usage may include:

Pass a parameter value to the backend within a database query;

Execute a different server functionality based on passed parameter value;

Locate a file on the file system;

Check the session parameter to be a valid session;

Store the referrer in the log file;

Or simply ignore the parameter altogether.

The URL examples include those described in the fingerprinting server functionality above.

The scanner 400 assigns a parameter type to those different types of server behavior, for example, file path, parameter operator, session parameter, data input parameter, one time token, and so on. File Path is a parameter used to locate a file on the file system. It can be a directory name or a file name. Often, only predefined sets of values can be valid for such parameters. Parameter operator is a parameter which value directly tells the server 100 to execute different operations, for example, add, or delete an item. Often, only a predefined, usually limited, set of values can be valid for such parameters. Session parameter is used to verify the request to determine that it belongs to a valid authenticated session. Within a single scan, a limited number of valid sessions are issued by the server 100. Any other values may be considered to be invalid by the server 100. Data input parameter is a parameter that the server 100 stores somewhere (for example in the response), or passes to the back end for further processing. There can be a very high, and sometime even unlimited, number of valid data input parameter values.

The scanner 400 can also determine the impact of the parameter to the output. For example, it may find that the controlling parameters impact the output, or that non-controlling parameters may perform behind-the-scene activity but do not impact the output.

The scanner 400 crawls and analyzes different parameter types differently to achieve a desired web site vulnerability scanning. For example, it may be optimal for the crawler 420 to crawl (and set up for attack) all possible parameter-operator values, because they explicitly execute different web site functionality. This allows more complete web site coverage.

On the other hand, crawling all the possible values of the input data parameters produces little informational value, after the first few values are tried by the crawler 420. Such requests usually execute the same web site functionality, so additional requests produce no new real informational value. Also, in case of unlimited valid input values, it is simply impossible to go through all of the possible input values. As a result, the scanner 400 utilizes an algorithm that alters the scanner behavior based on the input parameter type.

The scanner 400 detects parameter type using various methods including, but not limited to: user provided type, auto detection based on the response analysis, parameter name regex, parameter value regex, parameter location within an HTTP request, and so on. The auto-detection algorithms are defined below:

Based on parameter location, the default type is assigned. GET Query, POST, and cookie parameters are Data-parameters; sub-directory is Directory-parameters; file is File-parameter; Referer, user-agent, and other HTTP headers are Ignored-parameters;

Then various detection methods are executed, not necessarily in the below order.

The analysis is run on the parameter name and/or value. For example, a JSESSION cookie will be detected as a Session-parameter (a parameter that keeps track of user sessions); or a parameter with values Add or Delete will be classified as an Operator parameter (a parameter that defines which operation is executed);

The Controlling parameter analysis algorithm is executed to identify controlling parameters. A controlling parameter is any parameter that controls the result or response. A result may include, but not limited to, a final output, an interim output, streamed output, binary output, and so on. The controlling parameter type can also be a Data-parameter.

A fingerprinting server functionality algorithm is executed to identify parameters that change the response. Based on the analysis, the parameter type can be upgraded to the Data-parameter or Operator-parameter.

Figure 7:
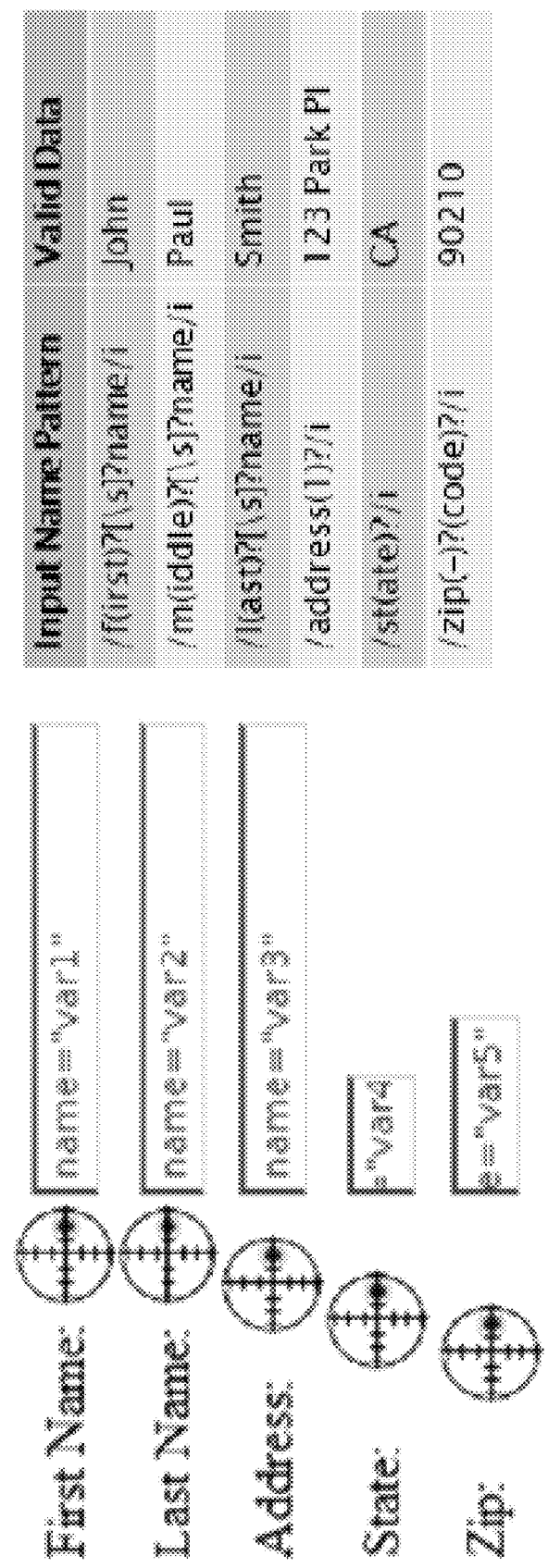
FIG. 7 is an exemplary analysis according to an embodiment of the present invention.

Presentation layer position and proximity analysis are used to determine more consistent text hints that are intended for the human user. Existing technologies rely on the input name or id which is set by the developers who can use any number of conventions. These are often hard to understand (see FIG. 5). This causes them to be unable to identify intended valid data, and are frequently forced to use generic data, which means that the requests can be rejected, preventing both deeper crawling of the application as well as effective attacking of that page (see FIG. 6). The scanner 400 uses an analysis of the rendered presentation layer to determine the Position and Proximity of each input to human readable text, then populates the fields with valid data (see FIG. 7).

Controlling Parameter Analysis.

In another embodiment, the scanner 400 utilizes the controlling parameter analysis to trim the attack space by removing attacks that either cannot succeed or cannot produce result. For example, executing all the available attacks in the attack space can be a long process, and sometimes impossible to complete due to time or other constraints. Also, some attacks cannot work on, and/or skip, non-controlling parameters. For example, attacks against a cookie that is not being checked on a static page value would consume valuable time, but will produce no result. Another example is when cookies are sent by the browser in every response, but it is not definite whether a cookie will be analyzed by a web site within the request or not. As such, executing a controlling parameter analysis on a cookie can highlight cookies that are being analyzed by the server.

Parameters can be classified as controlling and non-controlling parameters depending on whether and how the response changes when the parameter value changes. Changing the controlling parameter value modifies the response created by the website. Consequently, modifying non-controlling parameter values do not affect the response. An example of controlling parameters is a session cookie, whose value is being checked before each response generation. An invalid session cookie value results in a redirect to a login page response. An example of a non-controlling parameter is an ignored (during response generation) User-agent HTTP header, or ignored Referer HTTP header. It is still possible that the web site will process the non-controlling parameters in some way, for example, sending request user-agent and referer to the log file.

Identifying a parameter as controlling or non-controlling can be used to modify the behavior of the crawler 420 and/or attack engine 440. Controlling parameter detection is part of the Parameter Type analysis. If modifying the parameter value does not change the response then the attack that checks the response would not be able to produce a result due to a lack of changes in the response. Consequently, the attacks that rely on the response for the analysis can be skipped on non-controlling parameters, without decreasing the scan comprehensiveness.

The controlling analysis algorithm is defined below:

The parameter value is detected. Possible value types are: string, number, base64, path, date, time, and so on.

A set of analysis values is created based on parameter type. The analysis value set includes incorrect values (e.g., bad punctuation, invalid characters for a type, etc.), and correct values that might produce different response (e.g., 0 value for a number type, empty string for a string type, etc.).

The new request is constructed and sent to the server 100. The response is analyzed and compared with the original response. Following response types are expected—not changed response, similar response, different response, and an error response.

Based on the response type, the controlling algorithm assigns controlling status to a parameter.

Run preliminary controlling parameter analysis before scheduling attack on parameter The algorithm compares the response with modified parameter value against original response. Comparison happens by utilizing response signature algorithm.

Reflecting Parameter.

In another embodiment, the scanner 400 utilizes the reflecting parameter technique that reflects the user input. To illustrate, when testing for certain attacks, for example, Cross-Site Scripting (XSS), it is necessary to have certain conditions. One of these conditions is to have an input that takes the user input and includes it in the immediate response or on some other page. This would avoid attacking every single input with a collection of canned payloads.

The algorithm is defined below:

1. Run a preliminary reflecting parameter analysis before scheduling attacks on a parameter. This includes, but is not limited to, injecting a safe string into an input and looking for that data/string to show up in the response.

If the Parameter value is reflected in the response (either in the header or body part of the response) then the scanner 400 can check for any escaping routines that may be in place. To do this, the scanner 400 may generate another safe string, but add a dangerous character somewhere in the middle. The scanner 400 can then look at the response to see if injection worked without escaping.

From this point, the scanner 400 has a knowledge about the reflection point and the scanner 400 can limit attacking to benefit from performance and accuracy. This can include, but is not limited to, filtering a large potential collection of attack payloads down to the ones that are most likely to work.

2. If no reflection points are found then attacks, such as Cross-Site Scripting, can be skipped on non-reflecting parameters, or limited in the attacks performed.

Attack Space (Scan Time) Reduction.

In another embodiment, the scanner 400 develops attacks based on technology (and/or metadata). If there is a match between an attack technology and the site technology, then the attack is performed. Site technology can be defined broadly and includes, but is not limited to: operating system, database, site framework, client language, server language, web server, web app server, and so on. Information about site technologies may be auto detected and/or provided by the user. Examples of metadata include, but are not limited to, site language (English, French, etc.), region (USA, France, etc.), and so on.

Shared Code/Parameter Repetition Tolerance.

In another embodiment, the scanner 400 applies several techniques to optimize scan execution by paying attention to parameter names. In testing a web site, there is often a tradeoff between how well the user wants to test the web site and how much time the user has for testing. The general idea is to find the majority of vulnerabilities with minimum number of attacks sent to the server 100. One of the areas that can be optimized is the elimination of redundant attacks on the same code and same data. For instance, if the web scanner 400 knows that a parameter on two different pages is handled by the same code, it would test the parameter once on one page and skip testing the parameter on the other page.

The scanner 400 makes an assumption that parameters with the same name are more likely to be handled by the same code on the server side and access the same data on the server side and uses this assumption to scan the site more efficiently. The scanner 400 optimizes the scan for parameters with the same name by doing the following:

1. A scheduler keeps track of how many times the parameter was encountered during the scan.

2. After attacking one occurrence of the parameters with the same name, the scanner 400 will attack the other occurrences after it attacked all other parameters with a smaller number of occurrences (including unique parameters that, by definition, have number of occurrences equal one)

3. To avoid one parameter taking a disproportionate amount of attention during scanning, the scheduler has a limit of how many occurrences of the parameter with the same name to attack.

Statistics for each parameter are gathered through the whole scan, and used for crawling/attacking. The scanner 400 counts the number of times it sees the parameter (on different links) during the scan. In particular, the scanner 400 counts the number of times the parameter was crawled and attacked. Parameter tolerance value is consulted before scheduling the parameter either for crawl or attack.

To illustrate, consider the two URLs: http://www.site.com/show_book_front.php?book_id=14852 and http://www.site.com/show_book.php?book_id=14852&background=white. In this example, there is one parameter that appears on different links: book_id. While it may be handled by a different code on the server side and used to access different data, most likely it is not. The chances are that book_id is the parameter with which book is identified in the database and on both pages is handled by the same code. In this example, after attacking parameter book_id on the link show_book_front.php, it makes sense to attack parameter background first, because it is most likely that the parameter book_id will be handled by the same code and access the same data on both pages and if it is not vulnerable on one page, it will not be vulnerable on the other. And conversely, if book_id on the first link is vulnerable, it is more likely to be vulnerable on the other page as well because it is handled by the same vulnerable code and used to access the same data. While the scanner 400 cannot be absolutely sure about the connection between same-named parameters on different pages and not attack parameter book_id on the second page, the scanner 400 can use that assumption to define the order in which parameters are attacked: for example, parameters with unique names are attacked before subsequent occurrence of the parameters with the same name.

Sequences.

In another embodiment, the scanner 400 attacks only after a predefined sequence. A sequence is a set of requests in an application that need to be executed in a predefined order. If the requests are not executed in a predefined order, the application logic may be broken and the application will not be properly tested. For example, a sequence may be a shopping cart. The simple shopping cart sequence may be as follow:

Page 1: Add an item to a shopping cart

Page 2: Proceed to checkout

Page 3: Provide a credit card and shipping information.

Another example is a message board sequence which may be as follow:

Page 1: User submits a post to a message board

Page 2: User follows a redirect to a page that contains the user's posting.

Sequences can also be very important in applications that change user content on the same page, such as AJAX applications, and so on. Web application scanner first crawls an entire web application and creates a list of links. It then attacks the site with a number of attacks that far exceeds the number of links. If the web application scanner just attacks link number 2 of a sequence, for example, the application logic may be broken and the second link will not be tested. As a result, the scanner 400 repeats the first pages in a sequence with just a crawl and then attacks the page that has to be attacked. In the shopping cart example above, this technique would work as follows to attack page 3:

Page 1: (Add an item to a shopping cart)—web application scanner 400 crawls this page only with normal data.

Page 2: (Proceed to checkout)—web application scanner 400 crawls this page only with normal data.

Page 3: Provide a credit card and shipping information—web application scanner 400 attacks this page.

In some cases, it may be necessary to crawl pages after the attack to see if the attack was successful. The sequence attacking algorithm is as below:

Create a sequence (sequence can be found during the crawl, or can be provided by the user by having the user record a sequence either in a proxy or a recorder embedded in the web application scanner 400)

while have more steps construct request with transitional parameters, if any if attacking this steps inject an attack in the step and send a request else send step request extract transitional parameters from the response for the next request if step after attack then run analysis on response.

Link Locking.

A known problem in web application scanning is how to test all of the functionality of a web application in a finite amount of time. In order to provide results in a timely fashion, the scanner submits multiple requests simultaneously. A problem is that certain requests if submitted at approximately the same time may result in invalid responses and as a result, the web application scanner will not accurately test the web application. This is very important for sequences as multiple requests against a sequence can cause the web application to return an error and the web application will not be properly tested.

In another embodiment, to solve the above problem and to provide a reliable scan result, the scanner 400 utilizes a link locking algorithm. During the crawl or attack of the specific part of the site, some or all pages can be locked. This would restrict the web application scanner 400 from making more than a single request at once. In an embodiment, the scanner 400 may only lock the links of a certain subset of the site. This subset can be determined using a heuristic method, or the user can be asked to define this subset.

Multi-Session Crawling/Analysis.

In another embodiment, the scanner 400 improves scan performance by utilizing multiple sessions. A scan will be fast when run with multiple sessions. Additional analysis can also be performed by comparing results from the multiple sessions. Using this technique, the scanner 400 supports using multiple user credentials and session cookies. As a result, the scanner 400 may avoid being forced to use single threaded mode, due to active login limits per user, which often causes very slow scanning. The scanner 400 may also avoid being forced to use single threaded mode, due to global session state (e.g., VIEWSTATE) which limits concurrent activity session. This technique is also useful for privilege escalation analysis.

In the scanner 400, a session is a representation of a single user working with a web-site from a single browser. The session can be authenticated or non-authenticated. An authenticated session is when a user is identified either by entering user credentials in form, providing certificate, or providing user credentials for HTTP authentication, for example, Basic Authentication, NTLM, and so on.

In an embodiment, the scanner 400 uses multiple user sessions to achieve several goals which include, but are not limited to:

1. Running a single scan for web sites with multiple types of users is faster than running individual scan for each individual user type;

2. Running a scan for web sites with one user type is faster if multiple user sessions are used. The scanner 400 achieves this by:

a. Creating multiple user sessions based on the same username and password; or b. Using multiple user credentials of equivalent users and creating one session for one set of credentials.

3. Analysis of the cross-session data access (similar to privilege escalation).

These goals will be described in further details below.

Running One Scan with Multiple Types of Users and Testing.

Many sites provide access to different parts of the site for different types of users; sometimes, the same pages look differently depending on what user accesses them. For example, consider a health insurance web site with three types of customers: unauthenticated potential customers, current policy holders and service providers. While all three types of users will most like have different views of the web site and will access different locations on the site, they will share access to many general purpose pages, for example, customer support submission forms, help pages, and so on. Usually scanners allow only one user credentials for one scan and audit the site for one user. To test the health insurance site, such approach requires running the scan three times, one for each user type. As a result, shared pages that should be tested only once are tested three times, even worse all problems on shared pages will be reported three times. The scanner 400 solves this problem by creating multiple user sessions for the same scan and optimizes scan to minimize testing functionality shared by several users. If the page is visible for multiple user sessions and it behaves similar for all three users, it will only be attacked for one user session.

Running a Scan with One User Type.

The scanner 400 uses multiple user sessions for the same type of user to solve problem described in the Link Locking session (discussed above). However, many web sites behave unpredictably when multiple threads access the same resources simultaneously. Using multiple sessions allows the scanner 400 to access web site pages from a session even if they are locked in another session, increasing the number of simultaneous threads that can scan the site and reducing overall scan time.

For the purpose of this section, sites can be divided into two categories: sites that allow user to login and work with the site from more than one computer, and sites that do not allow that. For those two types of web site, the scanner 400 creates multiple user sessions in two different ways:

1. For sites that allow simultaneous access by the same user, the scanner 400 creates multiple user sessions with its own set Cookie, Session Parameters and Cached Files; and 2. For sites that do not allow a user to be simultaneously logged in from two computers, the scanner 400 configuration allows creation of multiple sessions with their own credentials as long as the user credential represents the user with the same access rights to the web site (equivalent users).

In both cases, the scanner 400 crawls the web site and discovers site structure using one session, and then, for attacking, the scanner 400 creates other sessions, logs them and distributes web site resources equally among sessions for attacking.

Analysis of the Cross-Session Data Access.

For sessions created for non-equivalent user types, the scanner 400 performs an analysis if the pages discoverable for one user can be directly accessed from another user that could not discover the pages himself. For example, consider a web site connected to an email server. The web site has a page that displays one email. Each user sees his own emails and can read only the emails that belong to him. The email ID is provided in query parameters of the URL, and the ID is global across mail server, e.g., http://www.buggymailserver.com/show_email?email id=8544423. If user A sees an email with email ID=888888 and user B obviously cannot see that email, the scanner 400 tries to retrieve email with ID 88888 in the session for the user B; and if successful it reports the cross session data access vulnerability on web site.

Smart Scheduling.

In another embodiment, the scanner 400 prioritizes attacks to increase comprehensiveness in a constrained environment. Most real life scans are run in a constrained environment. There can be many constraints that are applied on a scan. Examples include, but are not limited to, an open scan time window, total scan time, maximum number of allowed requests, maximum allowed server load, maximum concurrent requests, and so on. Scans can be limited by one or many of the above criteria. Examples include, but are not limited to, a production site that is opened for scanning only during off peak hours; a consultant engagement that has a short window for the site vulnerability evaluation; a site run in test environment on a developer's machine that has limited resources and can't handle the heavy load that the production servers can handle; time based session expiration; and so on. Even in scan scenarios that are assumed to have no limitations, there may still be an implied time limit of several days per scan.

A constrained environment means that only a subset of the attacks is going to be executed out of the total attack set. Running a subset of attacks opens a possibility of missing a vulnerability simply because certain attack was not executed. So to increase the scan comprehensiveness in a constrained environment it is essential to prioritize the attacks. Prioritizing attacks will reduce the possibility of missing a critical vulnerability.

Attack prioritization may be achieved by directly prioritizing available attacks, and indirectly by prioritizing the crawler tasks. Crawler prioritization is important considering that it is crawler task that finds attack points. So if the crawler is not able to find a vulnerable attack point within scan time, then the attacker will not be able to run analysis, and find the vulnerability.

Crawler prioritization is done based on combination of several criteria, for example:
- Web resource discovery index
- Web resource discovery depth
- Even site coverage. All parts of the web site need to be analyzed evenly
- Parameter coverage (how many times the parameter was already crawled on a different link)
- Link perceived importance based on keywords match
- Link perceived important based on content type, which can be guessed form link extension.

By implementing an even crawling, the scanner 400 can achieve a better site coverage in constrained environment. For example, the even site crawling will make sure that the crawler 420 will not be stuck on crawling the site help system, completely ignoring (by postponing) the user profile site section.

Attack prioritization improves scan results when there is a constraint applied on a scan. The scanner 400 prioritizes crawling and attacking in order to achieve a better coverage in the constrained environment. Attack prioritization is done based on combination of several criteria, for example:
- Number of times the link was attacked. Links with fewer attacks are prioritized.
- Number of times the parameter was attacked. Parameters with fever attack counts are prioritized.
- Fingerprint server functionality status (new functionality or already analyzed functionality). The requests that indicates new web site functionality (not yet analyzed) are prioritized.
- Parameter type (operator-parameter; data-parameter; ignored-parameter; path parameter; file-parameter)
- Controlling parameter analysis status
- Attack severity.
- Link and/or parameter perceived importance based on keyword match.

In order to avoid running duplicate attacks, each attack is classified by attack point type. Possible Attack point types include, but are not limited to:
- Website
- Directory
- File
- Parameter. Anything that was identified as a parameter by the scanner 400 (get parameter, post parameter, cookie, referer, dir-as-parameter, fragment,
- A request as a whole
- A response. Attacker runs a passive analysis on the responses, for example by executing regular expressions.
- XSRF Token Crawling.

The existence of one-time (e.g., Cross-Site Request Forgery, or XSRF or CSRF) tokens often makes it difficult to run attacks on save/prerecorded request, because the XSRF token value was already used, and the server would reject the request based on obsolete value. As such, requests that contain XSRF tokens need to be re-created during an attack with a new (fresh) XSRF token, in order to make the performed analysis valid. In an embodiment, the scanner 400 detects XSRF tokens during crawling, and constructs a sequence for the request that contains the XSRF token. All active analysis on the form then needs to be run as part of the sequence.

The scanner 400 supports forms that have a one-time token/parameter and must be requested from the server every time the form is submitted. The scanner 400 identifies this parameter by:
1. Using regular expression in default configuration that can recognize common types of one-time tokens in parameter values
2. Requesting pages that have forms twice and analyzing if form parameters were changed
3. Having configuration parameter that tells what parameters require refreshing
4. Having configuration parameter that removes false positives found by the scanner 400.

All one-time token parameters may be presented to the user.

Examples of sequence include: page has a form, with a hidden control that holds XSRF value; and form submission. All active analysis on the form then needs to be run as part of a sequence. For example: submit a request A, in order to refresh an XSRF token; submit a form with a new XSRF token, and a payload.

Rich Internet Application (RIA) Crawler.

In Web1.0, the users navigated web sites by switching from page to page. Most of the calculations were done on the servers. After a client machine received a page from the server, it mostly stayed static. In Web2.0, the users stay on a single page by clicking of page controls that dynamically load content from the web site and change the view of the page. Page modifications are generally done in response to user actions by scripts written either in Javascript or VBScript. In an embodiment, to properly crawl Web2.0 (and later) application, the crawler 420 uses MS web browser control, proxy as depicted in diagram in FIG. 8. To be able to crawl Web2.0 (and later) websites, the crawler 420 should be able to mimic the behavior of the user, performing all the actions on the page as the user would do and allow browser to execute all scripts that are executed to handle user input.

Figure 8:
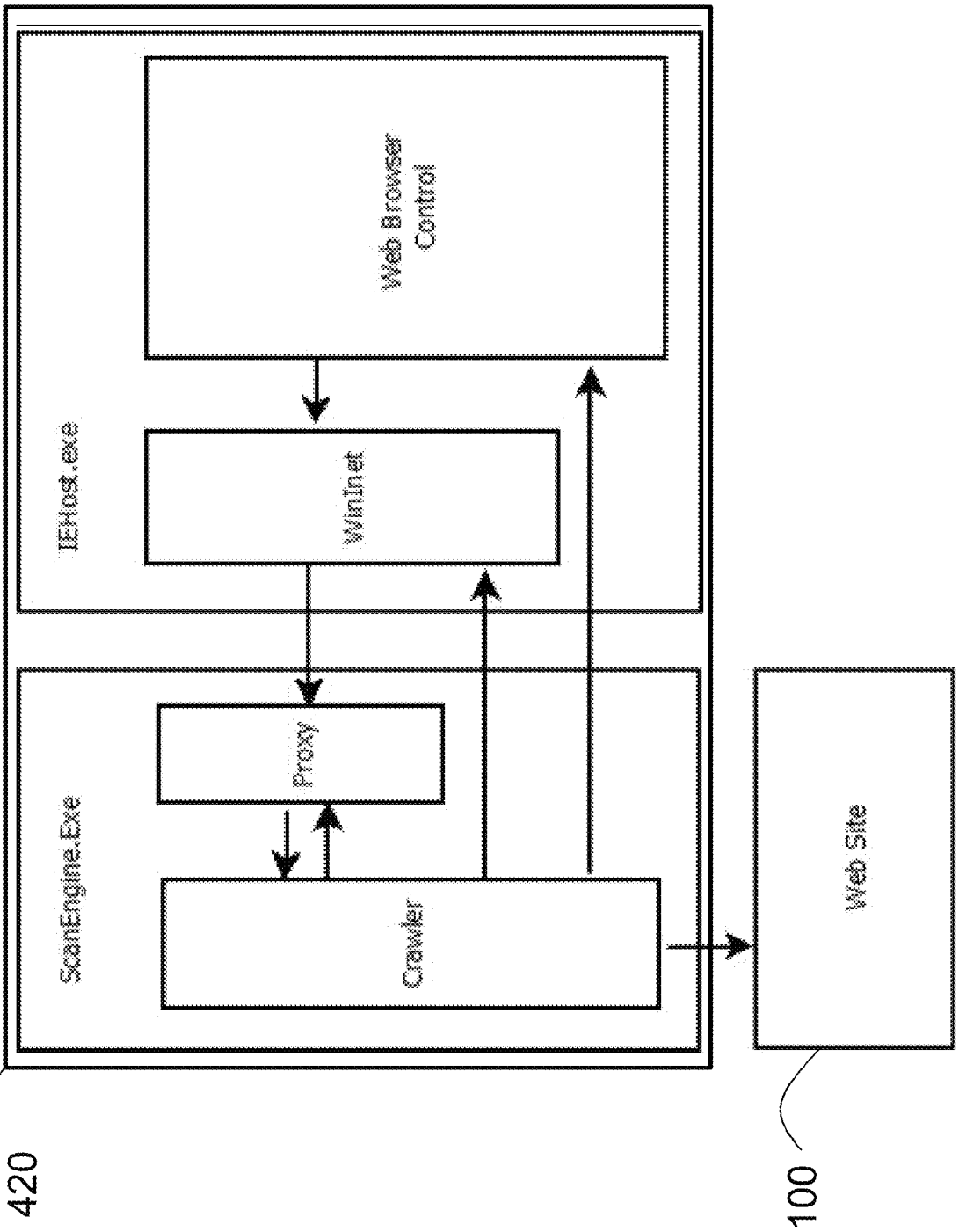
FIG. 8 is another exemplary diagram of a scanner according to an embodiment of the present invention.

As shown in FIG. 8, the Web2.0 (and later) crawler 420 consists of the following three components, among other:
- Browser Control hosted in IEHost.exe process
- Proxy
- Crawler
  a. IEHost.exe application hosts the browser control and configures the control and WinInet library (or the like), so that the browser control does not affect other instances on the browser control (within Internet Explorer, for example) running on the computer.
  b. Proxy resides in the scanner's ScanEngine process. When the proxy starts, it uses any available port on the computer for listening of the incoming requests. The port identifier is then passed to the IEHost application and is used to connect to the proxy. This approach eliminates the need to configure the proxy: it works from any available port on the computer.
  c. Crawler 420 is located in the scanner's 400 scan engine executable. This may be the component that is responsible of traversing Document Object Modules (DOMs) that can be generated by the page and coordinating efforts of browser control, HTTP proxy and DOM cache.

To make sure that the browser control does not affect other instances of the web browser, the crawler 420 configures WinInet library (or the like) used by the browser control to send all request via proxy and not use system cache and cookies. This is achieved by calling configuration methods of WinInet library and overwriting WinInet functions that browser control calls. The latter approach is used when there is no appropriate configuration function in WinInet library.

Crawling Algorithm.

A goal of the crawler 420 is to load a page, fill controls of the page (for example username, password, etc.) and execute all user actions (mouse click, keyboard strokes, etc). If the page's Document Object Module (DOM) changes as a result of the user actions, then for all new elements of the page, the process starts again. Note that DOM crawlers execute only events that have scripts associated with them. In an embodiment, an algorithm for traversing a Web2.0 page may be as below:

1. Navigate to a DOM: Load page+Execute sequence of events
2. Populate user controls
3. Enumerate new events (that did not exist in the previous DOM)
4. For each event repeat step 1

Optimization of Server Monitoring Integration.

One current method to improve the accuracy of web scanners is to monitor the activity at the server 100 that hosts the application. A sensor is placed at the server 100 to send data back to the web scanner. The web scanner uses this data to help determine if the application is vulnerable. A problem with this approach is that it requires that the web scanner run in a single threaded mode (one request at a time). The reason is that it is difficult to tell which request is associated with a particular reading from the sensor at the server 100. This can increase scan times exponentially and in some cases will make these scans impractical due to time constraints. To solve this problem, in an embodiment, the scanner 400 continues in multithreaded mode and to replay attacks in single threaded mode if there is a response at the server 100 potentially indicating the existence of a vulnerability.

For example, the scanner 400 may run 100 attacks in the space of a minute. If there is no response from the server sensor indicating that the application is vulnerable, the scanner 400 would continue to the next 100 attacks. If the server sensor indicated that there was a vulnerability, then the 100 attacks can be replayed in single threaded mode. Because most attacks are not successful, the amount of replaying should be minimal. This solution should reduce the time required for this type of scanning.

In another embodiment, the scanner 400 includes specific data in the HHTP header with a unique identifier (GUID) so that when multiple responses come back, the scanner 400 can associate the vulnerable response from the sensor with the attack that uncovered the vulnerability. This will also allow the attacks to continue in multi-threaded mode. This solution should also reduce the time required for this type of scanning.

Figure 9:
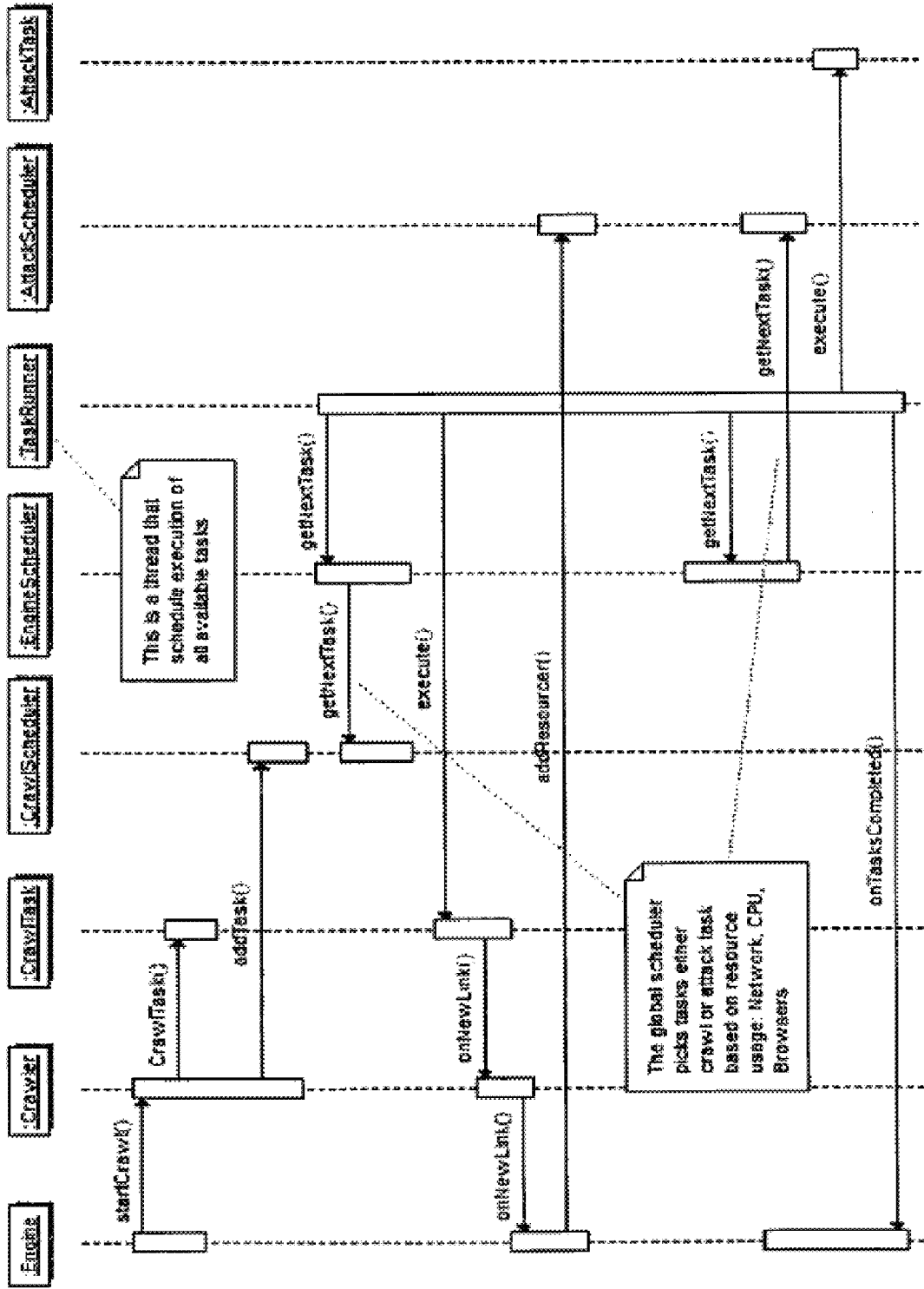
FIG. 9 is an exemplary diagram of the tasks of a scanner according to an embodiment of the present invention.

Turning to FIG. 9, according to an embodiment, a diagram of process tasks of the scanner 400 as described above is shown.

Figure 10:
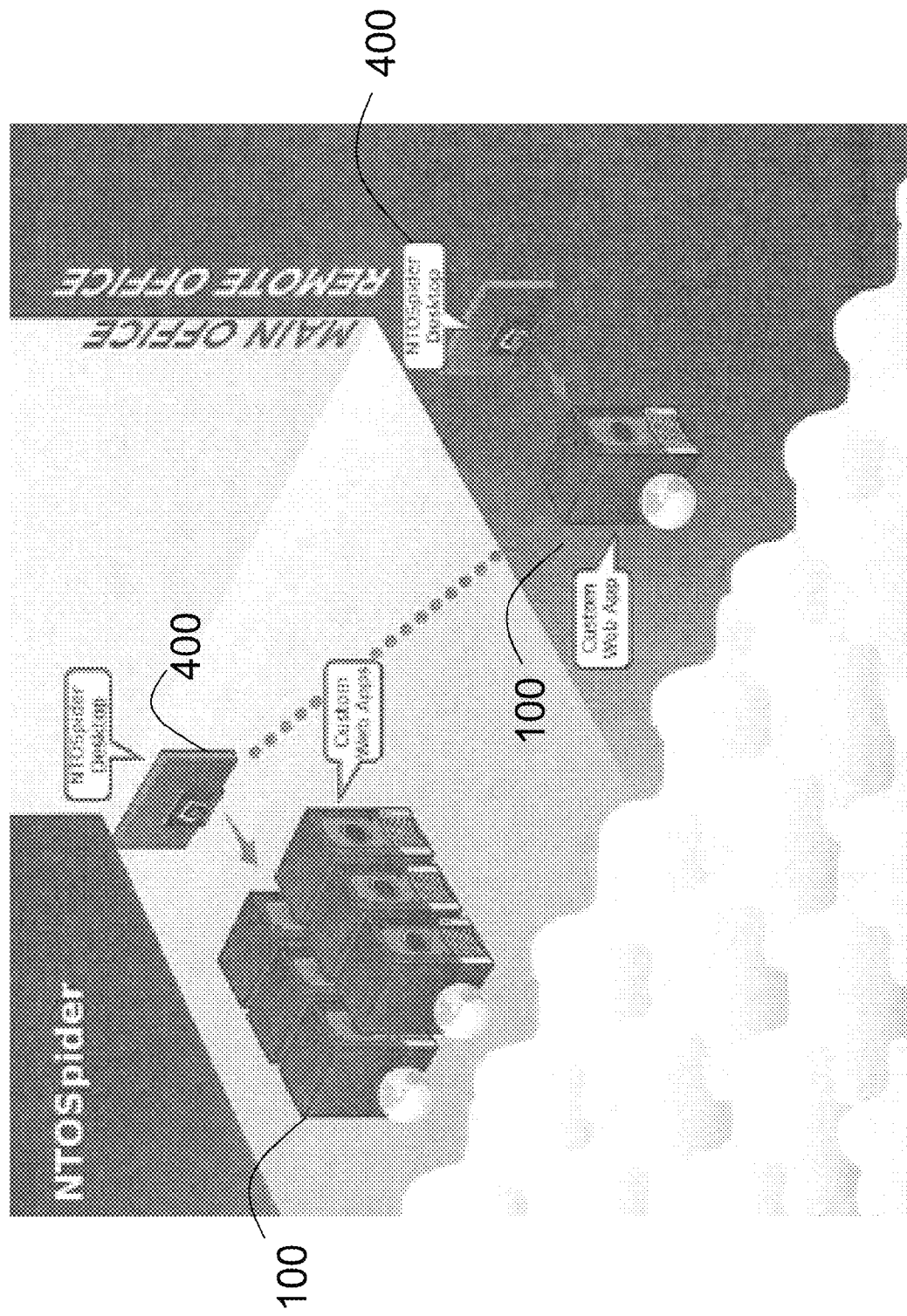
FIG. 10 is another exemplary diagram of a scanner and networked computing systems according to an embodiment of the present invention.
Figure 11:
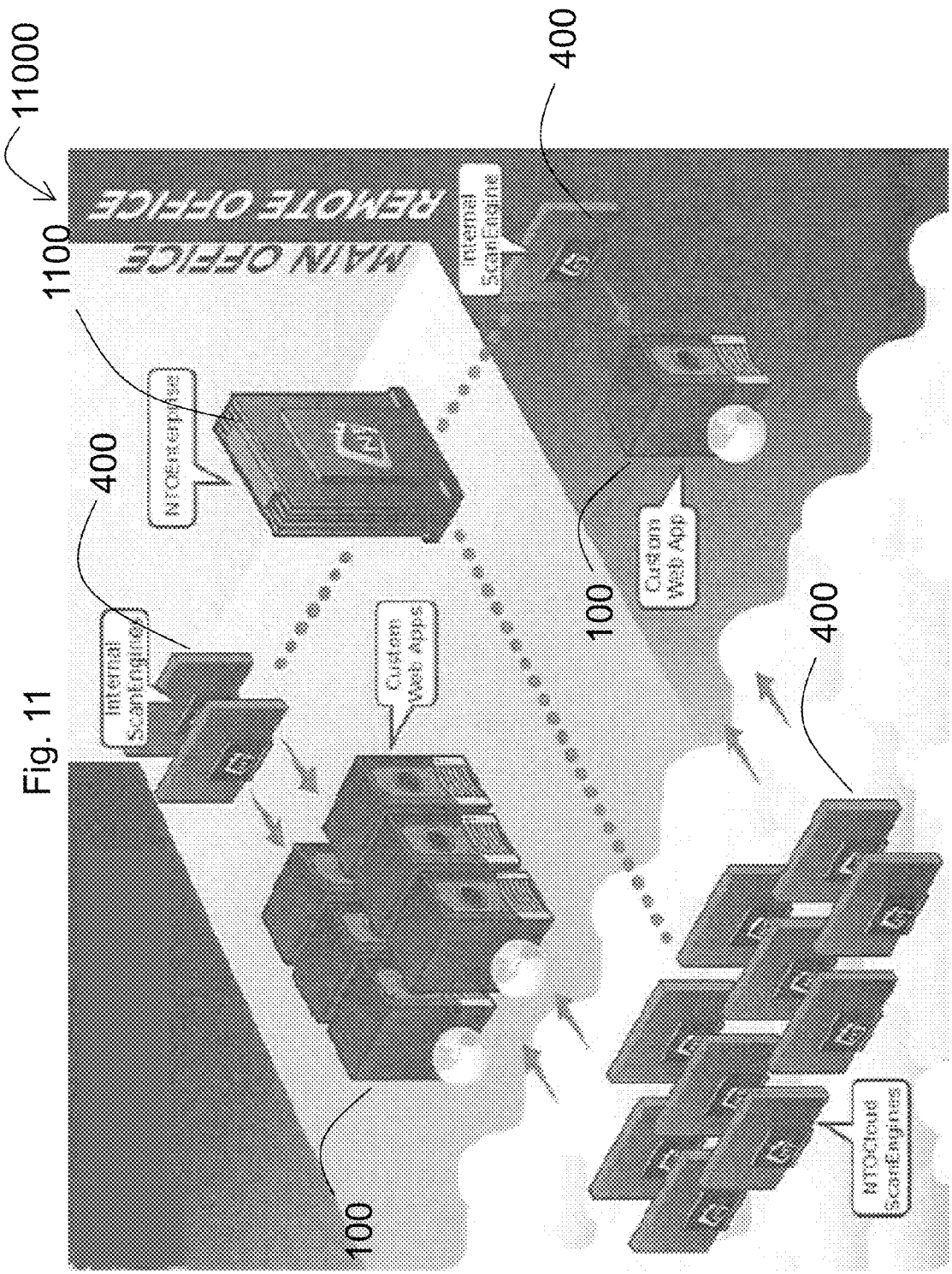
FIG. 11 is another exemplary diagram of a scanner and networked computing systems according to an embodiment of the present invention.

As mentioned above, the scanner 400 may be implemented in various architectures. Turning to FIG. 10, according to an embodiment, a diagram 10000 of the scanner 400 as used in either a local or remote (or both) environment is shown. FIG. 11, according to an embodiment, shows a diagram 11000 of the scanner 400 as used in an enterprise environment. The scanner 400 may also work with a centralized control and automation subsystem and/or application 1100, such as one provided by NTObjectives, Inc. (http://www.ntobjectives.com/security-software/ntoenterprise-centralized-application-security/). The subsystem 1100 provides enterprise management of scanning activity and vulnerability data, reporting solution with ability to reproduce attacks from the reports, ability to use cloud (or on-demand) services (FIG. 12) as needed, and so on.

Figure 12:
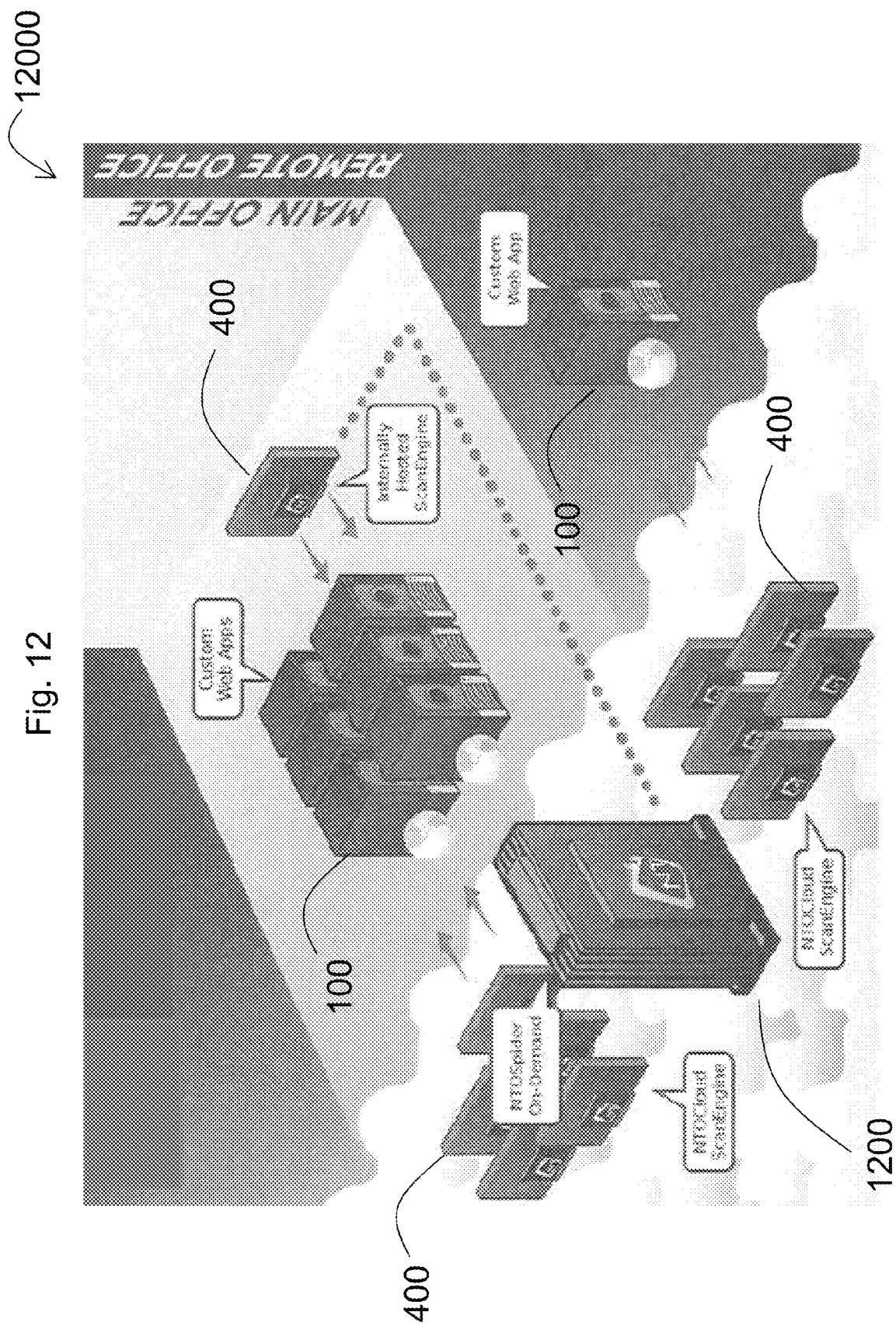
FIG. 12 is another exemplary diagram of a scanner and networked computing systems according to an embodiment of the present invention.

FIG. 12, according to an embodiment, shows a diagram 12000 of the scanner 400 as used in a cloud architecture (e.g., as Saas). In this architecture, the scanner 400 interacts with a SaaS version 1200 of the centralized control and automation subsystem and/or application, such as one provided by NTObjectives, Inc. (http://www.ntobjectives.com/services/ondemand-saas-security-scanning/).

Figure 13:
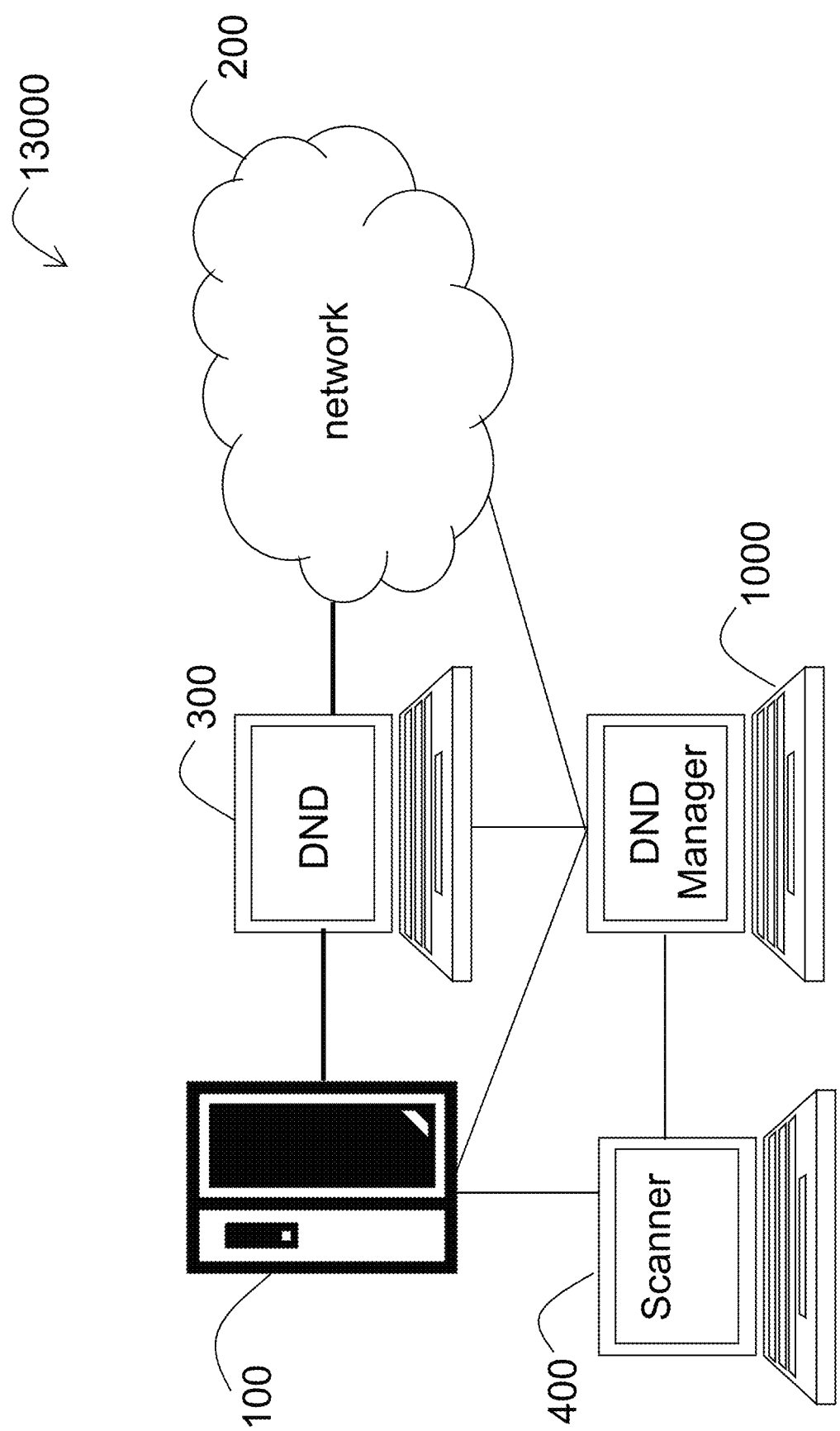
FIG. 13 is an exemplary diagram of a scanner, a defense network device system, and a networked computing system according to an embodiment of the present invention.

Turning to FIG. 13, according to an embodiment, a diagram 13000 of the scanner 400 as used with a defense network device ("DND") 300 and a defensive network management subsystem 1000 is shown. Such DND 300 and defensive network management subsystem 1000 are described in U.S. patent application Ser. No. 13/649,047, filed Oct. 10, 2012, entitled "System and Method for Testing and Managing Network Devices," which is incorporated herein by reference in its entirety.

Figure 14:
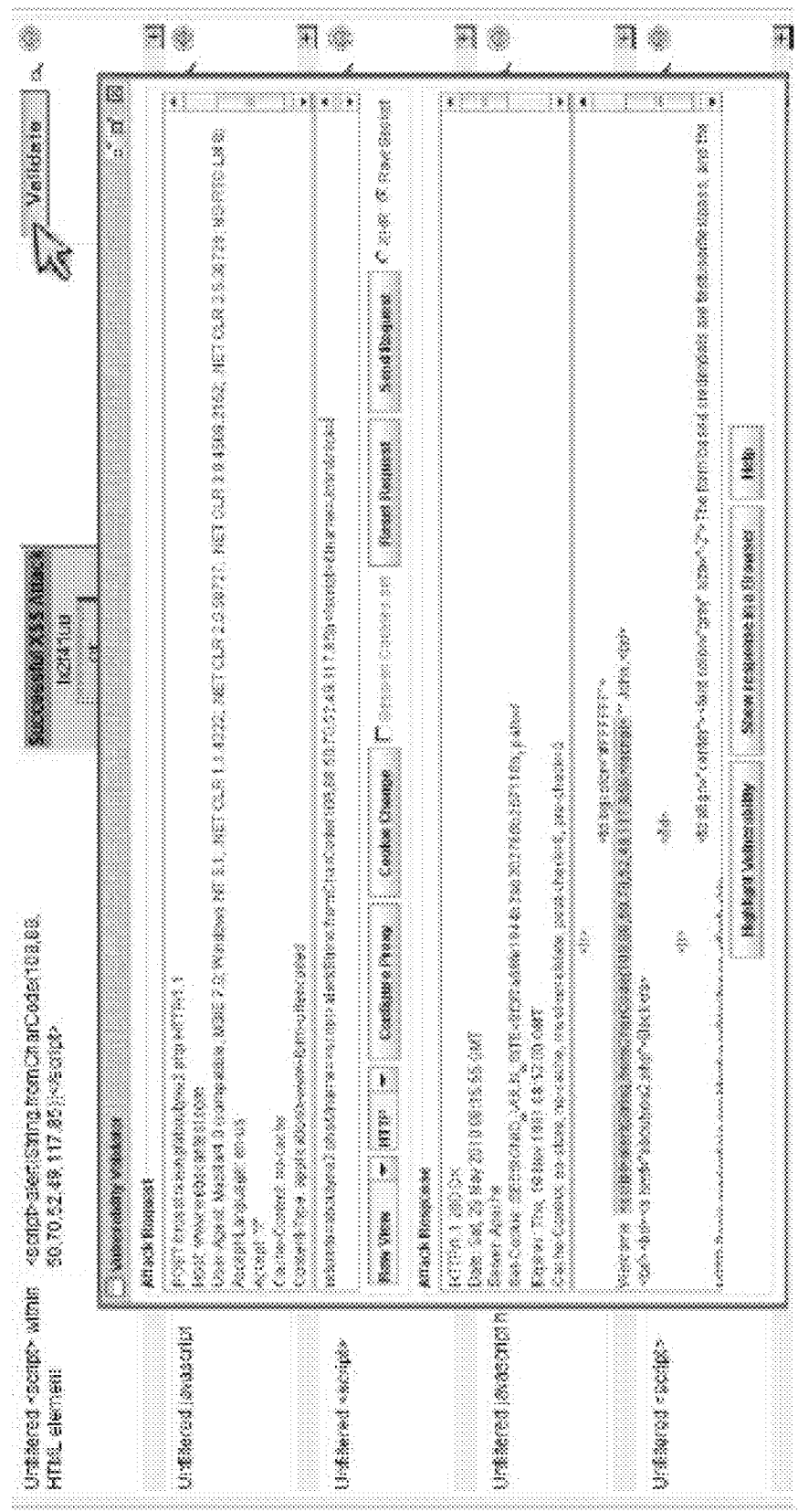
FIG. 14 is an exemplary report of a scanner according to an embodiment of the present invention.
Figure 15:
FIG. 15 is another exemplary report of a scanner according to an embodiment of the present invention.

In an embodiment, the scanner 400 provides interactive and structured reports (FIGS. 14 and 15) that communicate the sources of the problems, provide data for all levels of the process discussed above, including reproducing attacks, and so on. The reports also consolidate numerous vulnerabilities into "root causes", facilitate prioritization, coordination and tracking of remediation efforts (e.g., description and recommendations for each type of attack with links to sites with more information, etc.), and so on.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for web application scanning system; however, the invention can be used for any internet scanning system and application in general. Additionally and obviously, features may be added or subtracted as desired. Accordingly, the invention is not to be restricted except in light of the attached claims and their equivalents.

What is claimed is:

1. A dynamic analysis scanner subsystem communicatively coupled to a networked computing system, said dynamic analysis scanner subsystem configured to assess vulnerabilities in a networked computing system from data packets crawled and collected from
    one or more dynamic web pages of the networked computing system, wherein the one or more dynamic web pages support a first web service data format;
    a universal translator configured to identify the first web service data format from the collected data packets and translate the collected data packets from the first web service data format into a universal object representation;

an attack engine configured to receive the universal object representation of the data packets, modify said data packets with an attack payload, and send said data packets to the universal translator, wherein the universal translator is further configured to generate test data for the networked computing system by translating the modified data packets with the attack payload back into the first web service data format, and further wherein the dynamic analysis scanner subsystem is configured to:

transmit the generated test data to the networked computing system; and record the networked computing system's response to the generated test data.

2. The dynamic analysis scanner subsystem of claim 1, wherein the dynamic analysis scanner subsystem further comprises a smart scheduler configured to analyze how many times a data parameter was encountered in the crawled data packets and limit how many occurrences of the data parameter is included in an attack payload.

3. The dynamic analysis scanner subsystem of claim 1, wherein the dynamic analysis scanner subsystem further provides interactive reports that contains data enabling a user to reproduce an attack and a vulnerability.

* * * * *